US008719924B1

(12) United States Patent
Williamson et al.

(10) Patent No.: US 8,719,924 B1
(45) Date of Patent: May 6, 2014

(54) METHOD AND APPARATUS FOR DETECTING HARMFUL SOFTWARE

(75) Inventors: Matthew Williamson, Palo Alto, CA (US); Vladimir Gorelik, Palo Alto, CA (US)

(73) Assignee: AVG Technologies N.V. (NL)

( * ) Notice: Subject to any disclaimer, the term of this patent is extended or adjusted under 35 U.S.C. 154(b) by 1317 days.

(21) Appl. No.: 11/368,339

(22) Filed: Mar. 3, 2006

Related U.S. Application Data

(63) Continuation-in-part of application No. 11/229,041, filed on Sep. 16, 2005, now abandoned, and a continuation-in-part of application No. 11/229,013, filed on Sep. 16, 2005.

(60) Provisional application No. 60/658,441, filed on Mar. 4, 2005.

(51) Int. Cl.
G06F 12/14 (2006.01)
G06F 21/56 (2013.01)

(52) U.S. Cl.
CPC ............ *G06F 21/566* (2013.01); *G06F 21/565* (2013.01); *G06F 21/561* (2013.01); *G06F 21/562* (2013.01); *G06F 2221/033* (2013.01)
USPC .............................. 726/22; 726/24; 713/188

(58) Field of Classification Search
USPC ....................... 713/188; 726/22, 24
See application file for complete search history.

(56) References Cited

U.S. PATENT DOCUMENTS

| 5,649,095 | A | * | 7/1997 | Cozza .............................. 714/39 |
| 6,029,256 | A | * | 2/2000 | Kouznetsov ................. 714/38.1 |
| 6,357,008 | B1 | * | 3/2002 | Nachenberg .................... 726/24 |
| 6,711,583 | B2 | | 3/2004 | Chess et al. |
| 6,944,772 | B2 | | 9/2005 | Dozortsev |
| 7,017,155 | B2 | | 3/2006 | Peev et al. |
| 7,093,239 | B1 | | 8/2006 | Van der Made |
| 7,328,456 | B1 | * | 2/2008 | Szor et al. ........................ 726/26 |
| 7,519,998 | B2 | * | 4/2009 | Cai et al. .......................... 726/24 |
| 7,979,889 | B2 | * | 7/2011 | Gladstone et al. ................. 726/1 |
| 8,296,842 | B2 | * | 10/2012 | Singh et al. ..................... 726/22 |
| 2002/0059078 | A1 | * | 5/2002 | Valdes et al. ....................... 705/1 |
| 2002/0178375 | A1 | | 11/2002 | Whittaker et al. |
| 2002/0194490 | A1 | * | 12/2002 | Halperin et al. .............. 713/200 |
| 2003/0023875 | A1 | * | 1/2003 | Hursey et al. ................. 713/201 |
| 2003/0074567 | A1 | * | 4/2003 | Charbonneau ............... 713/186 |
| 2003/0074578 | A1 | | 4/2003 | Ford et al. |
| 2003/0120935 | A1 | * | 6/2003 | Teal et al. ...................... 713/188 |
| 2003/0167402 | A1 | * | 9/2003 | Stolfo et al. .................. 713/200 |
| 2003/0204569 | A1 | | 10/2003 | Andrews et al. |
| 2004/0073810 | A1 | * | 4/2004 | Dettinger et al. ............. 713/201 |
| 2004/0083372 | A1 | * | 4/2004 | Williamson et al. ......... 713/188 |
| 2004/0153644 | A1 | * | 8/2004 | McCorkendale et al. .... 713/156 |
| 2004/0187023 | A1 | * | 9/2004 | Alagna et al. ................ 713/200 |

(Continued)

OTHER PUBLICATIONS

Wagner, "Behavior Orientated Detection of Malicious Code at Run-Time," A thesis submitted to the College of Engineering at Florida Insttiture of Technology, May 2004, consisting of 88 pages.

(Continued)

*Primary Examiner* — Saleh Najjar
*Assistant Examiner* — Jason Plotkin
(74) *Attorney, Agent, or Firm* — Pepper Hamilton LLP

(57) ABSTRACT

Various embodiments for detecting harmful software are disclosed.

23 Claims, 3 Drawing Sheets

(56) References Cited

U.S. PATENT DOCUMENTS

| | | |
|---|---|---|
| 2004/0210796 A1 | 10/2004 | Largman et al. |
| 2005/0027686 A1* | 2/2005 | Shipp .............................. 707/3 |
| 2005/0080855 A1* | 4/2005 | Murray ........................ 709/206 |
| 2005/0086499 A1 | 4/2005 | Hoefelmeyer et al. |
| 2005/0132206 A1* | 6/2005 | Palliyil et al. ................ 713/188 |
| 2005/0132358 A1 | 6/2005 | Peev et al. |
| 2005/0155031 A1 | 7/2005 | Wang et al. |
| 2005/0187740 A1 | 8/2005 | Marinescu |
| 2005/0188272 A1 | 8/2005 | Bodorin et al. |
| 2006/0021041 A1* | 1/2006 | Challener et al. .............. 726/24 |
| 2006/0123244 A1* | 6/2006 | Gheorghescu et al. ....... 713/188 |

OTHER PUBLICATIONS

Security Innovation, "Gatekeeper II, New Approaches to Generic Virus Protection," 2003, consisting of 19 pages.

El Far et al, "On the Impact of Short-Term Email Message Recall on the Spread of Malware," EICAR 2005 Conference: Best Paper Proceedings, pp. 175-189.

"Gatekeeper II, New Approaches to Generic Virus Protection," Virus Bulletin Conference, Sep. 29-Oct. 2004, consisting of 11 pages.

\* cited by examiner

METHOD AND APPARATUS FOR DETECTING HARMFUL SOFTWARE

REFERENCE TO RELATED APPLICATION

This application claims the benefit of U.S. Provisional Application No. 60/658,441 filed 4 Mar. 2005. This application is also a continuation-in-part of U.S. application Ser. No. 11/229,041 filed 16 Sep. 2005. This application is also a continuation-in-part of U.S. application Ser. No. 11/229,013 filed 16 Sep. 2005. All these applications are hereby incorporated by reference.

BACKGROUND

Current technologies to deal with malicious code are largely derived from signature based mechanisms. Particular variants of malicious code have a unique 'signature" that can be generated (once the malicious code has been analyzed), distributed to machines and then used to check against software on a machine. This is the predominant technology to combat worms and viruses, and is increasingly used for other forms of malware.

Signature based mechanisms can be used to scan static (non-running) files and programs, to look for malicious code. They are often also used to dynamically scan programs on startup, or when loaded by other programs (e.g. scan word documents before loading into a word processor). Signature-based mechanisms are weak when the malicious code spreads quickly (it takes time to generate and distribute the signature), when the malicious code varies (either by changing its structure as its spreads, as in a polymorphic virus, or through customization by the malware author), or when the malicious code is rare (such as a customized Trojan). Unfortunately these characteristics are increasingly common in practice.

SUMMARY

Various embodiments relate to detecting harmful software. Some embodiments relate to creating one or more classifiers by assigning runtime characteristics to the classifier with an example of a particular class of harmful software. Some embodiments apply such a classifier to detect if unknown software that is different from the example also belongs to the particular class of harmful software. Other embodiments perform both the creation of the classifiers and using the classifiers for the detection of harmful software.

DETAILED DESCRIPTION

Various embodiments address the problem of malicious code running on computers. This code falls into a variety of categories, such as: worms and viruses which are programs that self-propagate; trojans or backdoors which are programs that allow unauthorized access to machines, as well as record information (passwords etc); and spyware which is software to record user actions.

Various embodiments take an alternative approach: instead of trying to uniquely identify the malicious code, the idea is to detect and constrain the behavior of the running program. The behavior based mechanism runs the malicious program, and from its running behavior determines whether the program is behaving maliciously. This allow unknown code to be identified as malware, even if the unknown code is different from the code used to train the classifier.

Many different aspects of the program behavior are measured, and these characteristics are then combined together using a classification algorithm to predict whether a running process is malicious or not. One of the key premises behind this technology is that most of malware of the same type exhibit similar behaviors. These behaviors are categorized and detectors for them are created and weights are automatically assigned to through a learning process. New malware of the same type can be detected and protected against without any prior knowledge of the specific malware.

One embodiment uses a Bayes classifier to learn the weights (tuning parameters) from known malware of a particular type and from normal programs. Other embodiments use other classification algorithms that would be suitable for this task (e.g. other mechanisms such as neural networks, genetic algorithms, decision trees, etc).

Figure 1:
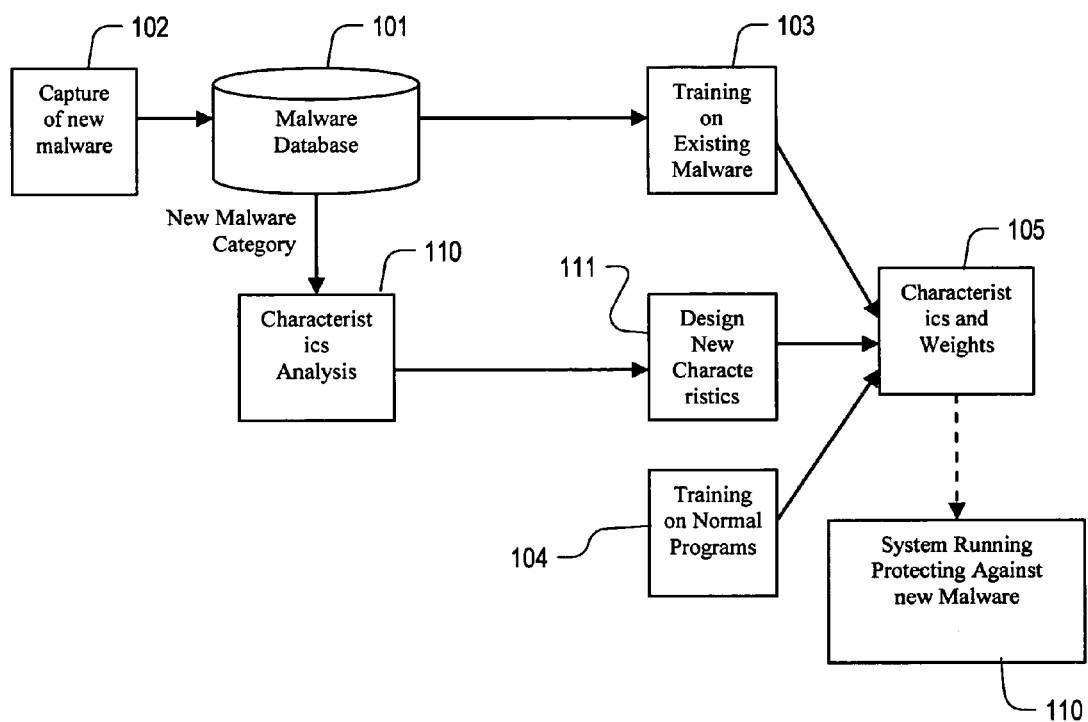
FIG. 1 shows an example of a system that creates classifiers for various classes of malware.

Although new types of malware (e.g. mail worms, Trojans, Macro Viruses, etc. . . . ) require new behavior detectors added to the anti-malware program, this is a very infrequent occurrence and can be handled with incremental updates. Trojans are used as an example of a particular malware in this discussion. FIG. 1 describes an exemplary overall process for updating and heuristics and probabilities of the behavioral approach. By performing this process, the characteristics can be created and tuned to protect end users. In this exemplary process, everything except the final component is run by the organization creating the malware protection system. FIG. 1 shows the characteristics and weights 105 which will be run and delivered to the customer machine, as the system running protecting against new malware 110. The characteristics and weights 105 may be associated with a single classifier or a multiple classifier, and the system 110 may execute a single classifier or a multiple classifier. In other embodiments, more of the components also run on the end user system. Various embodiments cover the entire system, components running on the end user system, and components running elsewhere, such as the components except for the end user components.

The architecture of the classifier varies, depending on the particular implementation. In one embodiment, the classifier includes a set of characteristics; a set of metadata about the characteristics, such as weights associated with the characteristics and whether any of the characteristics is necessary in order to determine that unknown software is a particular class of malware; and the algorithm that determines whether the unknown software is malware based on the characteristics and the metadata.

In another embodiment, the classifier includes the set of characteristics and the metadata, but not the algorithm. For example, the algorithm is a common algorithm that operates on each combination of a set of characteristics and metadata, to determine whether unknown software is safe or any one of multiple classes of harmful software. As a result, varying the characteristics and the metadata by themselves is sufficient to define different classifiers.

In yet another embodiment, the classifier includes the set of characteristics. For example, the set of characteristics is defined such that each particular characteristic is sufficiently specific to make weights unnecessary. Setting weights of certain characteristics to zero or some other sufficiently distinct number that renders certain characteristics much less important than others, is equivalent to removing characteristics from the set of characteristics. Setting weights in such a manner is therefore an example of assigning characteristics to a classifier. Thus, a further embodiment of the classifier is a set of weights. For example, the set of weights may be sufficient to select characteristics.

Detecting program behavior makes the overall detection system generic, so not dependant on any known characteristics of the program. For example, many trojans install keylogger routines to capture keystrokes. This can be detected and provide evidence that the program is malicious. This generic approach has the advantage that the system can detect malicious code before any signature is available, and can detect single variants of code that would not normally get a signature. Rather then being able to detect an individual piece of malware based on a signature, the system can detect a class of malware based on its behaviors. By combining different characteristics and classification weights the system can be used to detect multiple types of malware.

In order to accurately predict which processes are trojans, and those that are normal, it is important to get the right set of characteristics, and to combine them in the correct manner.

The best choices of behaviors are those that are 'fundamental' in some way: if a Trojan cannot exhibit this characteristic for fear of being detected, then it will be less effective as a Trojan. Examples of these characteristics include:

1) Surviving a reboot. Since computers are commonly rebooted, a Trojan needs to be able to survive a reboot to be effective 2) Stealth. To remain hidden from the user of the computer, a Trojan needs to hide itself from the user, by for example not having a visible window. Trojans can also hide by injecting code into running processes in order to hide files, registry keys, network connections or processes from the user.

3) Disguised executable. Often trojans disguise their executable by trying to make it look like a part of the windows operating system, e.g. with names will windll.exe running from the windows system directory 4) Network. For a Trojan to act as a backdoor, it needs to use the network.

5) Keylogger. Used to capture keystrokes.

6) Installation actions. The act of setting up the Trojan to survive reboot/hide itself can often be detected.

7) Injecting code into other processes. One way that trojans can hide is to inject code into running processes in order to either masquerade as that process, or to hide themselves from the user.

Some of these characteristics would be rare in normal programs (e.g. having a keylogger), while others are common (e.g. not having a visible window). The combination mechanism for the characteristics takes these frequencies into account when calculating whether a new set of characteristics corresponds to a trojan or not. Currently the system uses a Naïve Bayes Classifier. This is a well known mechanisms that calculates the probability that a class of programs (e.g. trojans) will exhibit a particular characteristic (e.g. have a visible window), and then combines those probabilities to calculate an overall score for each class. The system is trained using a collection of data from normal and Trojan programs, and the learnt probabilities are then used to predict the class of new data. FIG. 1 shows that a malware database 101, constructed from the ongoing collection of new malware 102, is used to train the system 103. The system is also trained with normal programs 104.

Different classes of malware will require different characteristics. For example for mass-mailers (viruses or worms that spread themselves via email), the following characteristics could be considered in addition to those above 1) Searching the files system. Email viruses need to find email addresses to spread to, and they often do this by searching the files on the computer.

2) Accessing email address books stored on the computer. Email viruses commonly do this to find email addresses.

3) Sending large volumes of email to different recipients. Without sending email the virus cannot propagate.

4) Querying the Domain Name System (DNS) to find the addresses of computers that accept mail for particular domains, so called MX records. Email viruses need to find a server that will accept the messages that they send, and they can use this mechanism to look them up.

For viruses that infect files, e.g. by writing themselves into the executable on the file system, the following characteristics would be important 1) Searching the file system for files to infect.

2) Modifying existing executables, something otherwise only carried out by installation programs To deal with false positives (incorrectly classifying a normal program as a Trojan), a variety of mechanisms are used. There are two forms of whitelist (lists of processes that are known-good). The first is a global whitelist meaning that any program on that is not a trojan, independent of which characteristics it displays. The second whitelist is on a per-characteristic granularity, e.g. certain programs may be "allowed" to exhibit certain characteristics without that contributing to their overall score. Such whitelists are stored in known good list and known bad list 216, shown in FIG. 2.

Another mechanism used to deal with false positives is a set of characteristics are marked as "necessary", and another set as "sufficient". A process can only be deemed to be a trojan if the classifier predicts that it is malicious, and it has all the necessary conditions and at least one of the sufficient ones.

An example necessary condition for trojans would be "using the network". An example set of sufficient conditions might be other common Trojan actions, e.g. installing a keylogger, injecting code into another process, etc. Thus a process that is predicted to be malware by the classifier, uses the network and exhibits at least one of the behaviors in the sufficient condition will be marked as malware.

For other classes of malware, there are likely to be different sets of necessary and sufficient conditions. For example, for an email virus, sending email is likely to be a necessary condition. When a new class of malware is encountered, the characteristics of the new malware class are analyzed 110 and designed 111 for the training process of FIG. 1.

It is also possible to add an extra set of weights that vary the importance of the individual probabilistic calculations, so for example increasing the importance of the keylogger characteristic with respect to the stealth characteristic.

Once the system detects malware it can perform any of the following:

1) Alert the user

2) Kill and quarantine the effected processes

3) Remove the malware from the system

4) Automatically or through user intervention instruct other instances of the system on different machines to kill, quarantine and/or remove the malware based on executable name and/or hash signature such as MD5 or SHA1

Figure 2:
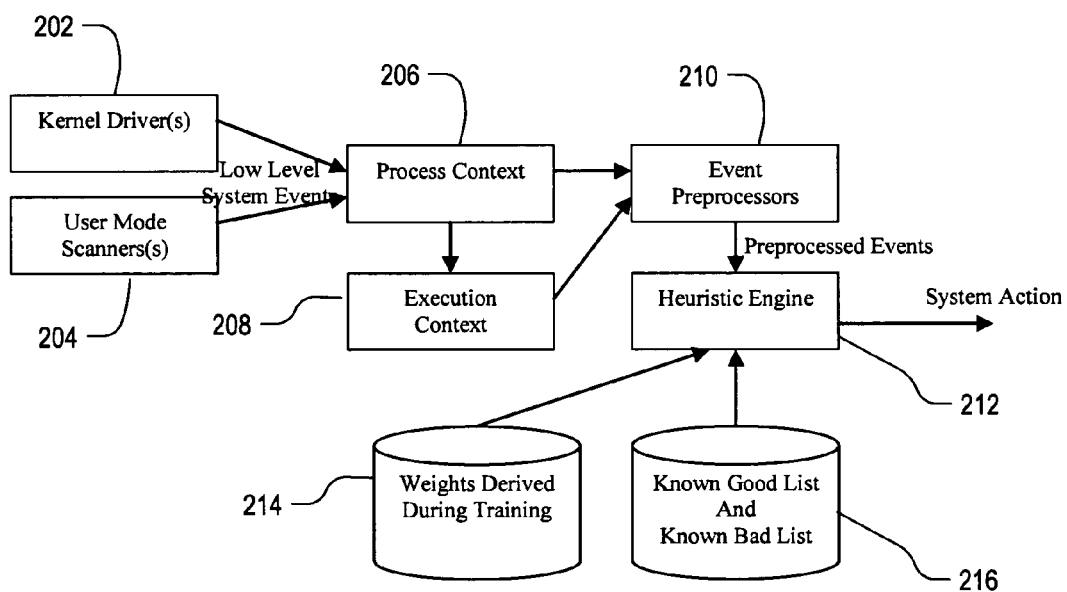
FIG. 2 shows an example of an end user's system that detects various classes of malware.

Once the values for the weights are calculated during training they are shipped along with the software. The overall architecture of the system is shown in FIG. 2.

The system includes a Kernel Drive 202 and User Mode Scanners 204 that hook various components of the operating system. The kernel driver 202 looks at the requests made by programs running on the protected system, such as system calls, graphics, and windows calls. The mode scanner scans for the after effects of various operations, such as windows visibility, various registry values, and existence and content of files and file links. When these components detect an interesting operation that generates a Low Level System event, the events are passed to a process content 206. Low Level System events are any type of resource, action, or status request that a running program makes from the operating system or any of its extensions such as a Microsoft Windows® subsystem. Some examples of low level system events include creation and setting of registry values, installation of global windows hooks, taking a snapshot of a screen and so forth. Depending on the type of an event they are either applied to the process or passed on to the executable context. The events that are kept at the process context only apply to that particular instance of a running program or executable. The events that are applied to the executable context 208 will apply to every running process instance of an executable. The decision of whether the events are applied to the process or executable depend on whether any of the events indicate that a process memory has been compromised. Once that indication is found all the events are applied to the process otherwise they are applied to an executable. This allows the system to differentiate between normal programs being hijacked and running malicious code in memory vs. malicious executables. On every new event passed to the event preprocessor 210 from the process context 206 or the execution context 208, the characteristics are calculated by the heuristic engine 212 based on weights generated during training 214, based on [Evaluation Equation] (see Bayes Classifier) and the process is determined to be either a malware or not based on the result.

A signature based mechanism requires constant updates as new examples of malware are found. This type of system would also need updates, but at a much slower rate: one would expect a single set of characteristics and classifier to be able to detect a large class of malware, but as the types of programs written evolve, changes would be needed to the characteristics and classifier. To that end the list of characteristics and the classification mechanisms are extensible, and a mechanism is provided whereby new characteristics and classification types can be added to the system as and when needed.

Bayes Classifier

The classifier is trained based on the data and samples as shown in FIG. 1.

Bayes rule says that the probability of a class cj given a data vector X is $$P(cj|X)=P(X|cj)P(cj)/P(X)$$

The probability of the data P(X) can be expressed as the $$\text{Sum\_over\_j } P(X|cj)P(cj)$$

For a data vector X that has data elements xi, e.g. x1, x2, x3 . . . xn, the Naïve Bayesian Classifier makes the assumption that underlying probability distributions are independent, so that $$P(X|cj)=\text{product\_over\_}i\ P(xi|cj)$$

P(xi|cj) can be simply calculated from data from
P(xi|cj)=(the number of times samples in class cj have value xi)/(the number of samples in cj)
i.e. the proportion of class members of cj that exhibit value xi
P(cj) is simply=(the number of samples for class cj)/(total number of samples)

For a two class problem, c1 and c2, when trying to classify a new data point X' into either class, if $$P(X'|c1)>P(X'|c2)$$

Then X' is predicted to belong to c1, and if not then c2
This can be rewritten as $$P(X'|c1)-P(X'|c2)>0$$

Or filling in the expansion for P(X|cj) above and taking logs $$\text{Sum\_over\_}i \log [P(xi|c1)]+\log [P(c1)]-\text{sum\_over\_}i \log [p(xi|c2)]-\log [P(c2)]>0$$

Or $$\text{Sum\_over\_}i \log [P(xi|c1)/P(xi|c2)]+\log [P(c1)/P(c2)]>0 \quad\text{[Evaluation Equation]}$$

The individual values of P(xi|cj) can be estimated from the data, and for a new data point this equation can be evaluated. If the function is >0, then it is predicted to belong to class c1, else c2.

So for trojans and normal, we collect data on the behavior of the running programs, that data is X, and the data for individual characteristics is xi. The training process includes running a wide variety of Trojan and normal programs, and collecting data on the characteristics that those programs exhibit. The set of trojans is defined to cover the broadest range of behaviors exhibited by that class of malware. The set of normal programs covers commonly used applications (office, browsers, instant messengers, email clients), as well as a sampling of other more obscure applications (security tools, various utility programs, etc.) The goal of the training data is to provide a reasonable approximation to the classes of normal and Trojan. As a rule of thumb, more training and more diverse training is better.

The classifier is trained by calculating P(xi|normal) and P(xi|Trojan) for each characteristic. Those values are then used to predict what type a new program is. (See FIG. 1).

There are two extra tuning parameters that we have introduced. Some embodiments have one, both, or neither. One is a weight on each characteristic, that allows the importance of each characteristic to be varied. This is accomplished with a weight \alpha_i So we calculate $$\text{Sum\_over\_}i\backslash\text{alpha\_}i \log [P(xi|c1)/P(xi|c2)]+\backslash\text{alpha\_0} \log [P(c1)/P(c2)]>0$$

\alpha_i allows the "strength" of each characteristic to be independently varied. For example, some of the characteristics are based on which directory in the file system the malicious code runs from. A particular directory may be commonly used by different forms of malware, thus resulting in the classifier learning that executing from that directory is a good indication of maliciousness. However, there is nothing inherently malicious about executing from a particular directory, as location in the filesystem is somewhat arbitrary. The \alpha_i weight can thus be used to reduce the strength of that characteristic in the classifier, e.g. to half its effect \alpha can be set to 0.5.

This mechanism can also be used to remove a particular characteristic from the calculation should it be determined (from manual testing) that the classification behaves better without it. For example if the detection of e.g. whether a process spawns other processes is very noisy and inaccurate, that characteristic can be removed from the classification calculation by setting \alpha=0.

The \alpha parameters can either be adjusted by hand (manually changing the values of \alpha_i, running the classifier and checking the performance), or by using an automated mechanism such as "hill climbing". This is a simple optimization mechanism well known in the prior art (along with others that accomplish the same purpose such as genetic algorithms, and simulated annealing). The basic idea is to randomly alter each \alpha_i by a small amount, and then check the performance of the new system. If it is improved then the new \alphas are again altered and so on. If the performance drops, the last set of \alpha is reverted and a new random modification is tried. When the increase in performance drops off (there is no improvement from some number of alterations), the algorithm can be stopped.

The second tuning parameter is the inclusion of a prior. This allow us to bias the calculations of P(xi|cj) to account for deficiencies in our training set. E.g. if we know that loading a kernel module is generally a malicious action, but in our training set it is not common, then we can add extra fake data points k_xi, so make the calculation of P(xi|cj)

$P(xi|cj)$=(the number of times samples in class $cj$ have value $xi+k\_xi$)/(the number of samples in $cj$+sum_over_$i$ $k\_xi$)

e.g. if k_(xi=0) is 5 and k_(xi=1) is 10, and there are no data samples in cj that have value xi=0, and 3 samples where xi=1, and overall 30 samples in cj, then the calculation would be $P(xi=0|cj)=(0+5)/(30+5+10)$ and $P(xi=1|cj)=(3+10)/(30+5+10)$ The number of fake data points is calculated by hand and adjusted manually so that the classifier can detect the malicious action without adversely affecting the number of false positives.

The previous description discussed an embodiment with a classifier for a two class system (trojans and normal). Other embodiments cover multiple classification classes. A multiple classifier that detects multiple classification classes may be either a single module with the ability to detect multiple classes of malware, or multiple modules that each detects a single class of malware. In another embodiment, a multiple classifier detects a particular type of malware with different classifiers varying with current characteristics, for example depending on whether the running software has had foreign code injected into the process or executable, or whether the executable code has been compressed.

One embodiment that covers multiple classification classes uses the same Bayesian formulation $P(cj|X)=P(X|cj)P(cj)/P(X)$ And calculate P(cj|X) for each of the different classes cj, and to classify a new data point X into the class with the largest value for P(cj|X).

Another embodiment that covers multiple classification uses pairwise classifiers, e.g. Trojan vs normal, email virus vs. normal.

Ease of implementation and tuning can indicate a preferable embodiment.

The computational cost of the classification is very low. In some embodiments, the training time is linear in the number of training samples, and the number of characteristics; and the testing time is linear in the number of characteristics.

In the system, the classifier is triggered to classify a particular process when its characteristics change. So, when e.g. we detect that a particular process is using the network, the process will gain that characteristic. If that characteristic has not been seen before for that process, then it will trigger the classifier to evaluate the process.

Many embodiments demonstrate features such as:
1) detect new and never seen instances of malware
2) learn from existing instances of malware in an automated fashion
3) Rely on event based architecture (rather then polling for characteristics)
4) Rely on information from the OS kernel for the events and characteristics as well as from the scanning for the results of operations in user mode. (Systems that operate only at the user mode can be circumvented and fooled by malware that is running at the same level of privilege as the protection program)
5) be updatable and extensible for new type of malware through a standardized process The following characteristics are a nonexhaustive list of process-level and executable-level characteristics which form part of a classifier. The characteristics in a classifier are extensible. A subset of these characteristics measure a harmful effect of the harmful software.

IMAGE_CHANGED. The executable file was updated. This implies that the executable has been modified on disk since monitoring this executable. This could be because the executable has been updated as part of a normal software update process, or in the worst case that the executable has been modified by a malicious program to run malicious code (for example, a file infecting virus).

SURVIVE_REBOOT. The executable is configured to automatically restart. On each reboot, Microsoft Windows® will automatically run the executable. Malicious programs generally need to survive reboot in order to be effective at stealing information from the user. However, many legitimate programs also survive reboot.

GUESS_SURVIVED_REBOOT. The executable appears to survive reboot as it runs immediately after the start of the Service Control Manager. While the executable was not explicitly registered to survive reboot, it did start immediately after the system was started, and thus appeared to survive reboot. Malicious programs generally need to survive reboot in order to be effective at stealing information from the user. However, many legitimate programs also survive reboot.

PARENT_SURVIVED_REBOOT The executable is spawned by a process that survives reboot. The executable is the child process of a process that survived reboot, so that it itself probably survived reboot. For example, if program TROJANSTARTER.EXE is set to survive reboot, and when it runs it spawns THETROJAN.EXE, then THETROJAN.EXE will actually survive the reboot, even though it was not explicitly registered to do so. This characteristic captures this behavior. This can be indicative of trojan behavior, as they sometimes use this level of indirection to avoid detection. It is relatively rare for normal programs to have this characteristic.

HAS_BEEN_ORPHAN_ The executable is an orphan process. The process is an orphan: its parent process has died. This is relatively rare for normal programs, but common in malicious programs.

IS_SPAWNER. The executable spawns other processes. The executable has spawned child processes.

ACTION_USED_NETWORK. The executable accessed the network. The executable used the network, either as a client accessing services on other machines, or listening on a certain network port. Malicious programs need to use the network to communicate with their controllers, send out information, receive software updates etc. However, many legitimate programs also use the network.

ACTION_UNUSUAL_NETWORK. The executable has unusual network activity. Programs that have this characteristic are already protected through application protection (either there is a profile for the application, or it is one protected after being discovered with application discovery). In this case, a profile will have been learned of how this executable uses the network. This characteristic means that the executable has used the network in a way that is anomalous (different from the previously learned behavior). This could mean that the application has been compromised. Possibly "The executable file was updated or it has had rogue code injected into its memory" (see "The process has had possibly malicious code injected into it by another process").

WINDOW_NOT_VISIBLE. The executable does not display a window on the screen. The executable does not have a window that is visible on the desktop. This implies that the program is trying to be stealthy, and invisible to the user. The majority of malicious programs will have this characteristic, however many system processes do not have visible windows.

PROCESS_IS_HIDDEN. The process is hidden from Microsoft Windows® Task Manager. In Microsoft Windows®, it is possible for programs to interfere with other processes by injecting code into their memory space. This is also known as "dll injection" as the code injected is usually contained a dll file. One common use for this code is to hide information from those programs. For example, it is possible to hide a running process from the Microsoft Windows® Task Manager (which normally lists all running processes), by injecting code into the Task Manager's memory space to modify how it displays processes to the user. A malicious program can use this technique to remain hidden from the user.

SMALL_IMAGE_SIZE. The size of the executable file image is very small. Malicious programs try to be stealthy, and one way to be stealthy is to minimize the impact on the underlying system. They are thus often small, lightweight programs. This characteristic means that the executables size is small. However, many normal executables are also small (such as some system processes, utilities).

WRITES_TO_WINDIR. The executable attempted to write to the Microsoft Windows® directory. The executable created other executable files in the Microsoft Windows® directory. Often, malicious programs install themselves in the Microsoft Windows® directory, as that directory contains many executables, and it is easy to remain unnoticed there. This is an indication of malicious behavior. However, some legitimate installation programs also copy executables to this directory.

WRITES_TO_PGM_FILES. The executable attempted to write to the Program Files directory. The executable created another executable file in the Program Files directory. This is the directory that most normal programs are installed by default, and would indicate that this program is likely to be a normal installation program. However, some malicious programs (particularly adware) install themselves in this directory.

EXEC_FROM_CACHE. The executable is executed from a cached area.

EXEC_FROM_WINDIR. The executable is executed from the Microsoft Windows® directory.

EXEC_FROM_PGM_FILES. The executable is executed from the Program Files directory.

OTHER_PATH. The executable did not execute from the Program Files directory, Microsoft Windows® directory or a cached area.

The above four characteristics are a report of where in the file system the executable resides. While this is not a strong indicator of malicious intent, it provide some hints about the type of executable that is running. Executables that run from the Program Files directory are likely to be legitimate, because that is the default directory where third-party software is installed. Some adware programs also run from this directory. Executables that run from the cache are more suspicious. Either they have been downloaded and run directly from a browser or email client, or they are programs running from the cache to hide themselves. Executables that run from the Microsoft Windows® directory can be suspicious. Often, malicious programs run from the Microsoft Windows® directory because there are many executables in that directory and it is easy to remain undetected there. However, most of the core windows executables and utilities run from this directory.

IS_SHADOW. The executable has the same name as a legitimate executable. This is evidence of a common mechanism that trojans and other malicious code use to hide themselves on a computer. They run with the same name as a legitimate executable, but are placed in a different part of the file system. For example, the real SERVICES.EXE (the legitimate Microsoft Windows® Service Control Manager) runs from C:\WINDOWS\SYSTEM32\SERVICES.EXE. A trojan many call itself SERVICES.EXE but be installed as C:\WINDOWS\SERVICES.EXE. If viewed in the Task Manager (which does not show the full path to the executable), both will look like legitimate SERVICES.EXE processes. An executable with this characteristic is suspicious. A known legitimate executable that occasionally has this characteristic is the Java SDK and JRE. Java is often installed in many different locations on a computer, and there are also commonly more often than one installed version. This can result in some Java processes having this characteristic.

P2P_CODE_INJECTION. The executable attempted to inject code into the address space of another process. The executable forcibly attempted to inject code into other running processes, forcing them to run foreign code. This is also known as dll injection. This is generally evidence of malicious activity. The injected code could be the malicious payload, so a compromised Notepad process, for example, could be logging keys and reporting stolen logins/passwords to an attacker. Alternatively, the injected code could be a rootkit trying to hide the real malicious process from detection.

HAS_DOUBLE_EXTENSION. The file name of the executable has a double extension. The executable is in the form MALWARE.JPB.EXE, so it has two or more three-letter extensions. Microsoft Windows® is configured by default to hide known file extensions, so in this example the file would be shown on the screen as MALWARE.JPG. This might fool an unsuspecting user that they were opening a JPG or image file, when in fact they were opening an executable. This is high suspicious.

WRITES_TO_REGISTRY_STARTUP. The executable attempted to write to the startup area of the Registry.

WRITES_TO_FS_OF_STARTUP_AREA. The executable attempted to write to the startup area of the file system.

The previous two characteristics indicate that the executable modified either portions of the registry or file system where executables are marked to be automatically restarted by Microsoft Windows®. This is suspicious because malicious programs must survive reboot to be effective on a user's machine, and they modify these areas to do so. Often they continually modify these areas to ensure that they continue to remain on the system. The normal programs that modify these places are installation programs, and some security program (such as anti-virus, anti-spyware).

TERMINATE_PROCESS. The executable terminates another running process. Some malicious programs attempt to terminate security programs (such as anti-virus, anti-spyware) running on the machine in order to avoid detection. This characteristic is flagged if a program is detected attempting to kill others. It is rare for normal programs to forcibly kill others, apart from security programs (anti-virus, anti-spyware), and utilities such as Task Manager.

LOAD_KERNEL_MODULE. The executable attempted to load a kernel module. The executable attempted to alter the functioning of the operating system kernel by forcing it to load a kernel module. Kernel-level rootkits, which are powerful pieces of malicious software are kernel modules, and have to be loaded in order to run correctly. This characteristic thus could indicate the installer of a rootkit. There are number of normal programs that install kernel modules, notably anti-virus software, to firewalls, and tools like Process Explorer, Regmon and Filemon from http://www.sysinternals.com.

PROCESS_MEMORY_COMPROMISED. The executable is a process code injection victim. This indicates that the process has had its memory compromised; another process has injected code into it. Code injection of this style is also known as dll injection. This means that the actions of the process may not be what they were originally programmed to be, as the process will be running the injected code. For example, a Notepad process could be running code to cause it to listen on a certain network port and allow remote access to the computer, which is not within the normal actions of a simple text editor. Generally a process with this characteristic is suspicious—it has been changed to run some other code.

PARENT_IS_VISIBLE_CMD_SHELL. The executable is spawned by a visible cmd window shell. Visibility is a strong indicator that a program is not malicious: most malicious software tries to be stealthy and hide from the user. This characteristic shows that the process is likely to be visible as it was spawned by a visible command shell window.

KEYLOGGER_WINDOWS_HOOK. The executable attempted to install a keylogger by the legitimate mechanism. Malicious programs install keyloggers to capture keystrokes and steal logins, passwords, and credit card numbers. Some legitimate programs install keyloggers to monitor whether the user is using the computer or not (for example, instant messaging programs that maintain a status). These legitimate programs often use a style of keylogger called a Microsoft Windows® Hook. This is a well-documented and accepted method for logging keys. This characteristic means that the program is logging keys using a legitimate mechanism. Any keylogging is suspicious, but this is a less suspicious way of doing it, at least compared to the following characteristic.

KEYLOGGER_GETKEYBOARDSTATE. The executable attempted to log keys; likely Spyware. The program attempted to log keys using a non-standard method, and is likely to be malicious. See "The executable attempted to install a keylogger by a legitimate mechanism." Programs that log keys can steal information such as logins, passwords and credit card numbers.

MODIFIES_HOSTS_FILE. The executable attempted to modify the hosts file.

MODIFIES_AUTOEXEC_BAT. The executable attempted to modify the autoexec.bat file.

MODIFIES_CONFIG_SYS. The executable attempted to modify the default set of drivers loaded at startup time.

The previous three characteristics are given when the executable attempts to modify configuration files associates with networking (hosts file), Microsoft Windows® startup (autoexec.bat file), or the default set of drivers loaded (config.sys file). While occasionally these files might be altered by an administrator, a program modifying these files is suspicious. The hosts file is an important file for configuring networking on the computer. By writing entries in the file, programs can redirect certain web sites to other places, without the user's knowledge. For example, all queries to www.google.com could be redirected to www.malicious-site.com. Autoexec.bat is a file that determines how Microsoft Windows® starts up. Malicious programs can modify the file to force Microsoft Windows® to start malicious programs at startup. The default drivers file (config.sys) can be modified so that a rogue kernel module is loaded, which could enable rootkit functionality.

TURNS_OFF_WINDOWS_FIREWALL. The executable attempted to turn off the Microsoft Windows® firewall. The program attempted to turn of the Microsoft Windows® firewall installed by default in Microsoft Windows® XP SP2. Turning off the firewall would allow a malicious program to use the network alerting the user. This action is suspicious.

HAS_SHORTCUT_IN_START_MENU. The executable has a shortcut in the start menu. The executable appears to have been installed correctly, and is thus likely to be legitimate. Some adware programs are installed correctly, but for the most part this is an indicator of a normal program.

INSTALLS_TOOLBAR. This is set when a process writes configuration data to cause the browser or the operating system to load a "toolbar", which is a piece of user interface functionality. For example a toolbar on Internet Explorer might allow the user to access a particular search engine directly from the window, without having to visit the search engine web page directly.

INSTALLS_COM_OBJECT. This is set when a process registers a particular executable as a COM object. COM is a Microsoft standard which allows programs to interact with one another using standard interfaces.

INSTALLS_BHO. The executable installed a Browser Helper Object.

Extra characteristics that might be useful for a classifier that only looks at executable-level (as opposed to process-level) characteristics would include:

EXEC_FROM_CACHE. The executable is executed from a cached area.

EXEC_FROM_WINDIR. The executable is executed from the Microsoft Windows® directory.

EXEC_FROM_PGM_FILES. The executable is executed from the Program Files directory.

OTHER_PATH. The executable did not execute from the Program Files directory, Microsoft Windows® directory or a cached area.

The above four characteristics are a report of where in the file system the executable resides. While this is not a strong indicator of malicious intent, it provide some hints about the type of executable that is running. Executables that run from the Program Files directory are likely to be legitimate, because that is the default directory where third-party software is installed. Some adware programs also run from this directory. Executables that run from the cache are more suspicious. Either they have been downloaded and run directly from a browser or email client, or they are programs running from the cache to hide themselves. Executables that run from the Microsoft Windows® directory can be suspicious. Often, malicious programs run from the Microsoft Windows® directory because there are many executables in that directory and it is easy to remain undetected there. However, most of the core windows executables and utilities run from this directory.

SMALL_IMAGE_SIZE. The size of the executable file image is very small. Malicious programs try to be stealthy, and one way to be stealthy is to minimize the impact on the underlying system. They are thus often small, lightweight programs. This characteristic means that the executables size is small. However, many normal executables are also small (such as some system processes, utilities).

IS_SHADOW. The executable has the same name as a legitimate executable. This is evidence of a common mechanism that trojans and other malicious code use to hide themselves on a computer. They run with the same name as a legitimate executable, but are placed in a different part of the file system. For example, the real SERVICES.EXE (the legitimate Microsoft Windows® Service Control Manager) runs from C:\WINDOWS\SYSTEMS32\SERVICES.EXE. A trojan may call itself SERVICES.EXE but be installed as C:\WINDOWS\SERVICES.EXE. If viewed in the Task Manager (which does not show the full path to the executable), both will look like legitimate SERVICES.EXE processes. An executable with this characteristic is suspicious. A known legitimate executable that occasionally has this characteristic is the Java SDK and JRE. Java is often installed in many different locations on a computer, and there are also commonly more than one installed version. This can results in some Java processes having this characteristic.

HAS_SHORTCUT_IN_START_MENU. The executable has a shortcut in the start menu. The executable appears to have been installed correctly, and is thus likely to be legitimate. Some adware programs are installed correctly, but for the most part this is an indicator of a normal program.

HAS_DOUBLE_EXTENSION. The file name of the executable has a double extension. The executable is in the form MALWARE.JPG.EXE, so it has two or more three-letter extensions. Microsoft Windows® is configured by default to hide known file extensions, so in this example the file would be shown on the screen as MALWARE.JPG. This might fool an unsuspecting user that they were opening a JPG or image file, when in fact they were opening an executable. This is highly suspicious.

IS_LSP. The executable is registered as a Layered Service Provider (LSP). An LSP is a code module inserted into the network stack that alters the way that the computer handles network events.

TRUSTED_INSTALLER. The executable is digitally signed by a trusted company.

IS_COM_OBJECT. The executable is registered as a COM object.

IS_PLUGGABLE_PROTOCOL_HANDLER. The executable is registered as a network protocol handler.

IS_WINLOGON_EXTENSION. The executable is registered as a Winlogon extension. This is augments the behavior of the windows operating system by responding to events such as startup, shutdown, user logon, logoff etc.

IS_BHO. The executable is registered as a Browser Helper Object. This is an executable that extends the functionality of the browser and the underlying operating system.

IS_URLSEARCHHOOK. The executable is registered as a search hook. This allows the modification of the search of internet sites.

IS_TOOLBAR. The executable is registered as a toolbar, augmenting the functionality of the browser.

IS_APPINITDLL. The executable is registered to be loaded into all windows processes, so augmenting their functionality.

INSTALLED_VIA_IM. The executable was installed by an instant messaging program.

INSTALLED_VIA_EMAIL. The executable was installed via an email reader.

INSTALLED_VIA_BROWSER. The executable was installed by a browser.

IS_PACKED. The executable is packed, meaning compressed or encrypted. This is to reduce the size of executables. Many malicious programs are packed to evade detection by signature based mechanisms.

A classifier for installers uses any of the same characteristics as originally described (process and executable level), but would use a different set of training data, resulting in a different set of weights.

In some embodiments, the classifier is associated not only with runtime characteristics based on runtime behavior (processes) of suspected harmful software, but also with static characteristics based on the executable, such as the contents and the location of the executable.

Figure 3:
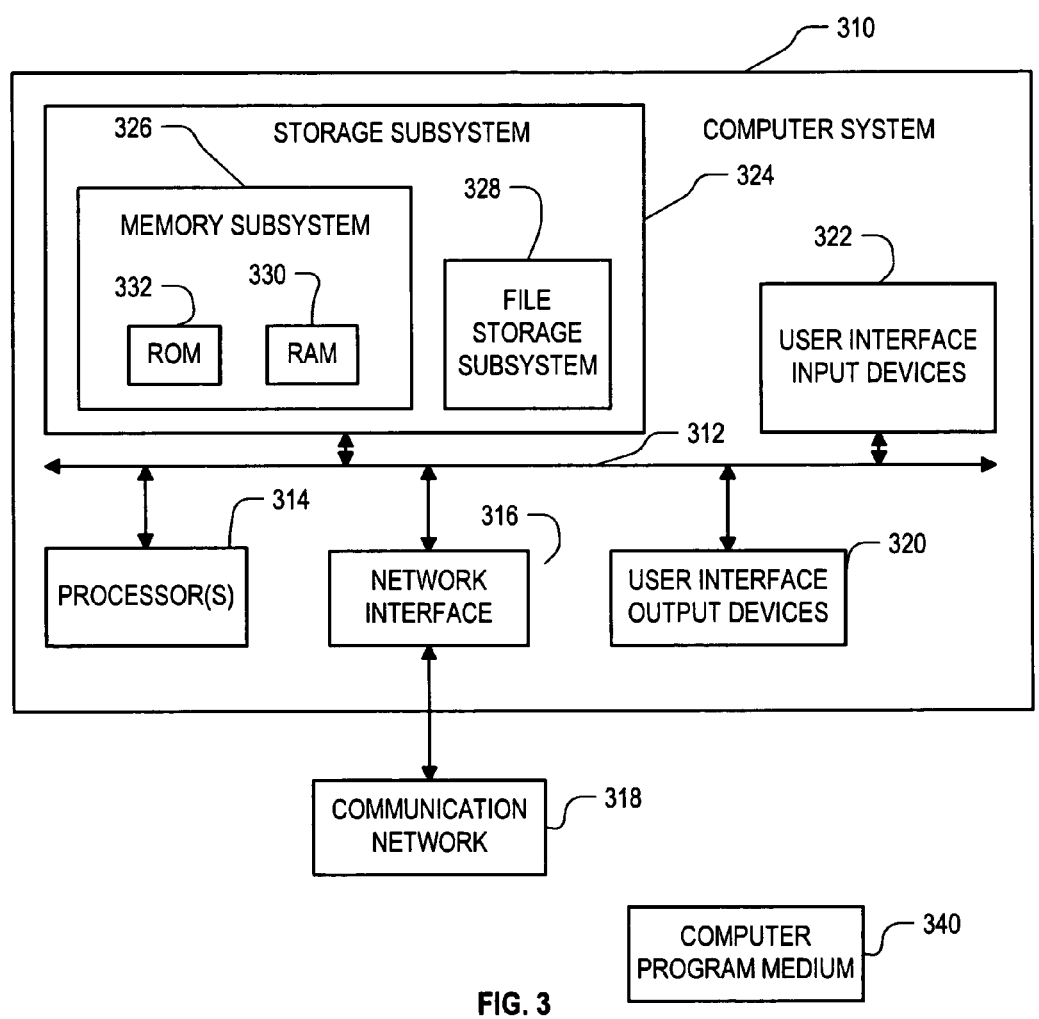
FIG. 3 shows an exemplary computer apparatus and computer code medium that are embodiments of the invention.

FIG. 3 is a simplified block diagram of a computer system 310 suitable for use with embodiments of the present invention. Computer system 310 typically includes at least one processor 314 which communicates with a number of peripheral devices via bus subsystem 312. These peripheral devices may include a storage subsystem 324, comprising a memory subsystem 326 and a file storage subsystem 328, user interface input devices 322, user interface output devices 320, and a network interface subsystem 316. The input and output devices allow user interaction with computer system 310. Network interface subsystem 316 provides an interface to outside networks, including an interface to communication network 318, and is coupled via communication network 318 to corresponding interface devices in other computer systems. Communication network 318 may comprise many interconnected computer systems and communication links. These communication links may be wireline links, optical links, wireless links, or any other mechanisms for communication of information. While in one embodiment, communication network 318 is the Internet, in other embodiments, communication network 318 may be any suitable computer network.

User interface input devices 322 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include all possible types of devices and ways to input information into computer system 310 or onto computer network 318.

User interface output devices 320 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 310 to the user or to another machine or computer system.

Storage subsystem 324 stores the basic programming and data constructs that provide the functionality of certain embodiments of the present invention. For example, the various modules implementing the functionality of certain embodiments of the invention may be stored in storage subsystem 324. These software modules are generally executed by processor 314.

Memory subsystem 326 typically includes a number of memories including a main random access memory (RAM)

330 for storage of instructions and data during program execution and a read only memory (ROM) 332 in which fixed instructions are stored. File storage subsystem 328 provides persistent storage for program and data files, and may include a hard disk drive, a floppy disk drive along with associated removable media, a CD-ROM drive, an optical drive, or removable media cartridges. The databases and modules implementing the functionality of certain embodiments of the invention may be stored by file storage subsystem 328.

Bus subsystem 312 provides a mechanism for letting the various components and subsystems of computer system 310 communicate with each other as intended. Although bus subsystem 312 is shown schematically as a single bus, alternative embodiments of the bus subsystem may use multiple busses.

Computer program medium 340 can be a medium associated with file storage subsystem 328, and/or with network interface 316.

Computer system 310 itself can be of varying types including a personal computer, a portable computer, a workstation, a computer terminal, a network computer, a television, a mainframe, or any other data processing system or user device. Due to the ever-changing nature of computers and networks, the description of computer system 310 depicted in FIG. 3 is intended only as a specific example for purposes of illustrating the preferred embodiments of the present invention. Many other configurations of computer system 310 are possible having more or less components than the computer system depicted in FIG. 3.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A method for detecting harmful running software, comprising:
   running a software application on a computing device, wherein the software application is associated with a probability that the software application is harmful, wherein the software application performs a plurality of behaviors while running, wherein each of the plurality of behaviors defines a specific action that the software application performs;
   while the software application is running, for each behavior performed by the software application:
      determining if the behavior is required for the software application to be identified as harmful,
      identifying the behavior as a necessary behavior if the behavior is required for the software application to be identified as harmful,
      determining an updated probability that the software application is malicious based on the behavior, and
      in response to the updated probability exceeding a threshold value and the software application having performed at least one necessary behavior:
         identifying the software application as harmful, and
         performing an action on the software application.

2. The method of claim 1, wherein identifying the behavior as a necessary behavior comprises:
   determining a class of software associated with the software application;
   comparing the behavior to a classifier associated with the class to determine whether the behavior is a necessary behavior for the class.

3. The method of claim 1, wherein identifying the behavior as a necessary behavior comprises:
   identifying the software application as a Trojan Horse; and
   identifying one or more of the following as a necessary behavior:
      surviving a reboot,
      an ability to remain hidden from a computer user,
      a disguised executable,
      use of a network,
      capturing one or more keystrokes, and
      injecting code into one or more running processes.

4. The method of claim 1, wherein identifying the behavior as a necessary behavior comprises:
   identifying the software application as a mass-mailer; and
   identifying one or more of the following as a necessary behavior:
      searching a files systems,
      accessing an email address book,
      sending a large volume of emails to a plurality of different recipients, and
      querying a domain name system to find one or more addresses of computers that accept email for particular domains.

5. The method of claim 1, wherein determining an updated probability comprises:
   applying a classifier to the software application, wherein the classifier comprises:
      a plurality of characteristics that define one or more software behaviors, metadata corresponding the plurality of characteristics, and one or more characteristic weights associated with the plurality of characteristics.

6. The method of claim 5, wherein the classifier is created using a code portion that is at least partly different from at least one code portion of the software application.

7. The method of claim 5, wherein the characteristics comprise one or more of the following:
   an executable attempts to turn off a firewall;
   an executable attempts to load a kernel module; and
   an executable spawns one or more processes.

8. The method of claim 1, wherein the probability is based on one or more characteristics that define one or more software behaviors and metadata associated with the one or more characteristics.

9. The method of claim 1, wherein determining an updated probability comprises:
   in response to determining that the behavior is included on a whitelist, excluding the behavior in determining the updated probability.

10. The method of claim 1, wherein identifying the software application as harmful comprises:
    in response to the software application being identified on a whitelist, not identifying the software application as harmful, wherein the whitelist identifies software applications that are not harmful; and
    in response to the software application not being identified on the whitelist, identifying the software application as harmful.

11. The method of claim 1, wherein performing an action on the software application comprises performing one or more of the following:
    alerting the user that the software application is harmful;
    quarantining the software application;
    removing the software application; and
    killing the software application.

12. A method for detecting harmful running software, comprising:
  running a software application on a computing device, wherein the software application is associated with a probability that the software application is harmful, wherein the software application performs a plurality of behaviors while running, wherein each of the plurality of behaviors defines a specific action that the software application performs; and
  while the software application is running, for each behavior performed by the software application:
    determining if the behavior is required for the software to be identified as a class of harmful software,
    identifying the behavior as a necessary behavior if the behavior is required for the software application to be identified as a class of harmful software,
    identifying the behavior as a sufficient behavior if the behavior is indicative of the class of harmful software, but is not a necessary behavior,
    determining, by the computing device, an updated probability based on the behavior, and
    in response to the updated probability exceeding a threshold value and the software application having performed all necessary behaviors associated with the class of harmful software and at least one sufficient behavior associated with the class of harmful software:
      identifying the software application as harmful, and
      performing an action on the software application.

13. The method of claim 12, wherein identifying the behavior as a necessary behavior comprises:
  identifying the software application as a Trojan Horse; and
  identifying one or more of the following as a necessary behavior:
    surviving a reboot,
    an ability to remain hidden from a computer user,
    a disguised executable,
    use of a network,
    capturing one or more keystrokes, and
    injecting code into one or more running processes.

14. The method of claim 12, wherein identifying the behavior as a necessary behavior comprises:
  identifying the software application as a mass-mailer; and
  identifying one or more of the following as a necessary:
    searching a files systems,
    accessing an email address book,
    sending a large volume of emails to a plurality of different recipients, and
    querying a domain name system to find one or more addresses of computers that accept email for particular domains.

15. The method of claim 12, wherein determining an updated probability comprises:
  applying a classifier to the software application, wherein the classifier comprises:
    a plurality of characteristics that define one or more software behaviors, metadata corresponding the plurality of characteristics, and one or more characteristic weights associated with the plurality of characteristics.

16. The method of claim 15, wherein the classifier is created using a code portion that is at least partly different from at least one code portion of the software application.

17. The method of claim 15, wherein the probability is based on one or more characteristics that define one or more software behaviors and metadata associated with the one or more characteristics.

18. The method of claim 15, wherein determining an updated probability based on the behavior comprises:
  in response to determining that the behavior is included on a whitelist, excluding the behavior from determining the updated probability.

19. The method of claim 15, wherein identifying the software application as harmful comprises:
  in response to the software application being identified on a whitelist, not identifying the software application as harmful, wherein the whitelist identifies software applications that are not harmful; and
  in response to the software application not being identified on the whitelist, identifying the software application as harmful.

20. The method of claim 12, wherein performing an action on the software application comprises performing one or more of the following:
  alerting the user that the software application is harmful;
  quarantining the software application;
  removing the software application; and
  killing the software application.

21. A method for detecting harmful running software, comprising:
  running a software application on a computing device, wherein the software application is associated with a probability that the software application is harmful, wherein the software application performs a plurality of behaviors while running, wherein each of the plurality of behaviors defines a specific action that the software application performs; and
  while the software application is running, for each behavior performed by the software application:
    determining if the behavior is required for the software application to be identified as a class of harmful software or if the behavior is indicative of the class of harmful software,
    identifying the behavior as a necessary behavior if the behavior is required for the software application to be identified as a class of harmful software,
    identifying the behavior as a sufficient behavior if the behavior is indicative of the class of harmful software, but is not a necessary behavior,
    determining whether the behavior causes one or more low level system events, wherein each low level system event corresponds to a request made by the software application from an operating system,
    determining, by the computing device, an updated probability based on the behavior and the one or more low level system events, and
    in response to the updated probability exceeding a threshold value and the software application having performed all necessary behaviors associated with the class of harmful software and at least one sufficient behavior associated with the class of harmful software:
      identifying the software application as harmful, and
      performing an action on the software application.

22. The method of claim 21, wherein the low level system events comprise one or more of the following:
  setting a registry value;
  installing a global hook; and
  generating a snapshot of a screen.

23. The method of claim 21, wherein performing an action on the software application comprises performing one or more of the following:
  alerting the user that the software application is harmful;
  quarantining the software application;
  removing the software application; and
  killing the software application.

* * * * *